(12) United States Patent
Jain et al.

(10) Patent No.: US 12,481,196 B2
(45) Date of Patent: Nov. 25, 2025

(54) OPTICAL PHASE SHIFTER WITH ONE OR MORE INTEGRATED THERMOELECTRIC DEVICES

(71) Applicant: GlobalFoundries U.S. Inc., Malta, NY (US)

(72) Inventors: Vibhor Jain, Essex Junction, VT (US); Yusheng Bian, Ballston Lake, NY (US); Shesh Mani Pandey, Saratoga Springs, NY (US); Abdelsalam Aboketaf, Essex Junction, VT (US); Ravi Prakash Srivastava, Clifton Park, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 349 days.

(21) Appl. No.: 18/094,716

(22) Filed: Jan. 9, 2023

(65) Prior Publication Data
US 2024/0231173 A1   Jul. 11, 2024

(51) Int. Cl.
*G02F 1/21* (2006.01)
*F25B 21/04* (2006.01)
(Continued)

(52) U.S. Cl.
CPC .............. *G02F 1/212* (2021.01); *F25B 21/04* (2013.01); *G02F 1/0147* (2013.01); *G02F 1/025* (2013.01);
(Continued)

(58) Field of Classification Search
CPC ..... G02B 6/125; G02F 1/0121; G02F 1/0147; G02F 1/025; G02F 1/212; G02F 1/225;
(Continued)

(56) References Cited

U.S. PATENT DOCUMENTS

| 6,278,822 B1 | 8/2001 | Dawnay |
| 6,981,380 B2 | 1/2006 | Chrysler et al. |

(Continued)

FOREIGN PATENT DOCUMENTS

| FR | 3005755 A1 * | 11/2014 | ............ G02F 1/015 |
| KR | 20180058619 A * | 6/2018 | |

OTHER PUBLICATIONS

English translation of FR-3005755-A1 (Year: 2014).*
(Continued)

*Primary Examiner* — Uyen Chaun N Le
*Assistant Examiner* — Darby M. Thomason
(74) *Attorney, Agent, or Firm* — Thompson Hine LLP; Anthony Canale

(57) ABSTRACT

Structures including an optical phase shifter and methods of forming a structure including an optical phase shifter. The structure comprises an optical phase shifter including a waveguide core having a first branch and a second branch laterally spaced from the first branch. The structure further comprises a thermoelectric device including a first plurality of pillars and a second plurality of pillars that alternate with the first plurality of pillars in a series circuit. The first plurality of pillars and the second plurality of pillars disposed adjacent to the first branch of the waveguide core, the first plurality of pillars comprises an n-type semiconductor material, and the second plurality of pillars comprises a p-type semiconductor material.

20 Claims, 14 Drawing Sheets

(51) Int. Cl.
  *G02F 1/01*     (2006.01)
  *G02F 1/025*    (2006.01)
  *G02F 1/225*    (2006.01)
  *H10N 10/17*    (2023.01)
  *H10N 10/851*   (2023.01)
  *H10N 10/852*   (2023.01)
  *G02B 6/125*    (2006.01)
  *G02F 1/015*    (2006.01)

(52) U.S. Cl.
  CPC ............ *G02F 1/225* (2013.01); *G02F 1/2257* (2013.01); *H10N 10/17* (2023.02); *H10N 10/852* (2023.02); *H10N 10/8556* (2023.02); *G02B 6/125* (2013.01); *G02F 1/0151* (2021.01); *G02F 2202/10* (2013.01); *G02F 2203/50* (2013.01)

(58) Field of Classification Search
  CPC ............... G02F 1/2257; G02F 2202/10; G02F 2203/21; G02F 2203/50; H10N 10/17; H10N 10/852; H10N 10/8556; F25B 21/04
  See application file for complete search history.

(56) References Cited

U.S. PATENT DOCUMENTS

| | | | | |
|---|---|---|---|---|
| 2003/0090775 | A1* | 5/2003 | Webb | G02F 1/0147 359/279 |
| 2013/0008479 | A1* | 1/2013 | Chen | H10N 10/17 136/205 |
| 2015/0147026 | A1 | 5/2015 | Svilans | |
| 2016/0170238 | A1* | 6/2016 | Svilans | G02F 1/0147 385/1 |
| 2017/0248805 | A1* | 8/2017 | Gill | G02F 1/011 |
| 2022/0357629 | A1 | 11/2022 | Tanobe et al. | |
| 2024/0244977 | A1* | 7/2024 | Tuley | H10N 10/82 |

OTHER PUBLICATIONS

English translation of KR-20180058619-A (Year: 2018).*
European Patent Office, Extended European Search Report and Opinion issued in European Patent Application No. 23205376.9 on Apr. 10, 2024; 8 pages.
R. Enright at el., "Integrated Thermoelectric Cooling for Silicon Photonics." ECS Journal of Solid State Science and Technology, vol. 6, No. 3, N3103-N3112, DOI 10.1149/2.0151703jss, Feb. 16, 2017.
Javier Garcia et al., "Fabrication and Modeling of Integrated Micro-Thermoelectric Cooler by Template-Assisted Electrochemical Deposition." 2017 ECS Journal of Solid State Science and Technology, vol. 6, No. 3, N3022-N3028, DOI 10.1149/2.0051703jss, Jan. 6, 2017.
E. E. Aktakka, N. Ghafouri, C. E. Smith, R. L. Peterson, M. M. Hussain and K. Najafi, "Post-CMOS FinFET Integration of Bismuth Telluride and Antimony Telluride Thin-Film-Based Thermoelectric Devices on SoI Substrate," in IEEE Electron Device Letters, vol. 34, No. 10, pp. 1334-1336, Oct. 2013, doi: 10.1109/LED.2013.2277693.
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.
M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.
Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.
Y. Bian et al., "Integrated Laser Attach Technology on a Monolithic Silicon Photonics Platform," 2021 IEEE 71st Electronic Components and Technology Conference (ECTC), 2021, pp. 237-244, doi: 10.1109/ECTC32696.2021.00048.
A. Aboketaf et al., "Towards fully automated testing and characterization for photonic compact modeling on 300-mm wafer platform," 2021 Optical Fiber Communications Conference and Exhibition (OFC), 2021, pp. 1-3.
Goldsmid HJ. "Bismuth Telluride and Its Alloys as Materials for Thermoelectric Generation." Materials (Basel). Mar. 28, 2014;7(4):2577-2592. doi: 10.3390/ma7042577. PMID: 28788584; PMCID: PMC5453363.
Y. Lee, E. Kim and K. G. Shin, "Efficient thermoelectric cooling for mobile devices," 2017 IEEE/ACM International Symposium on Low Power Electronics and Design (ISLPED), 2017, pp. 1-6, doi: 10.1109/ISLPED.2017.8009199.
Z. Ren, Z. Yu, J. C. Kim and J. Lee, "Hotspot Management by Holey Silicon-Metal Composites for 1 kW/cm2 and Beyond," 2019 18th IEEE Intersociety Conference on Thermal and Thermomechanical Phenomena in Electronic Systems (ITherm), 2019, pp. 1253-1259, doi: 10.1109/ITHERM.2019.8757392.

* cited by examiner

OPTICAL PHASE SHIFTER WITH ONE OR MORE INTEGRATED THERMOELECTRIC DEVICES

BACKGROUND

The disclosure relates to photonics chips and, more specifically, to structures including an optical phase shifter and methods of forming a structure including an optical phase shifter.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

Photonics chips may include optical phase shifters that are used to modulate the phase of light propagating in a waveguide core. A Mach-Zehnder interferometer is a type of phase shifter that splits propagating light into a pair of optical signals that are phase-modulated relative to each other and then recombined. An electro-optical phase shifter can be used to modulate the phase of propagating light under the control of a radiofrequency signal.

Improved structures including an optical phase shifter and methods of forming a structure including an optical phase shifter are needed.

SUMMARY

In an embodiment of the invention, a structure comprises an optical phase shifter including a waveguide core having a first branch and a second branch laterally spaced from the first branch. The structure further comprises a thermoelectric device including a first plurality of pillars and a second plurality of pillars that alternate with the first plurality of pillars in a series circuit. The first plurality of pillars and the second plurality of pillars are disposed adjacent to the first branch of the waveguide core, the first plurality of pillars comprise an n-type semiconductor material, and the second plurality of pillars comprise a p-type semiconductor material.

In an embodiment of the invention, a method comprises forming an optical phase shifter including a waveguide core having a first branch and a second branch laterally spaced from the first branch, and forming a thermoelectric device including a first plurality of pillars and a second plurality of pillars that alternate with the first plurality of pillars in a series circuit. The first plurality of pillars and the second plurality of pillars are disposed adjacent to the first branch of the waveguide core, the first plurality of pillars comprise an n-type semiconductor material, and the second plurality of pillars comprise a p-type semiconductor material.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
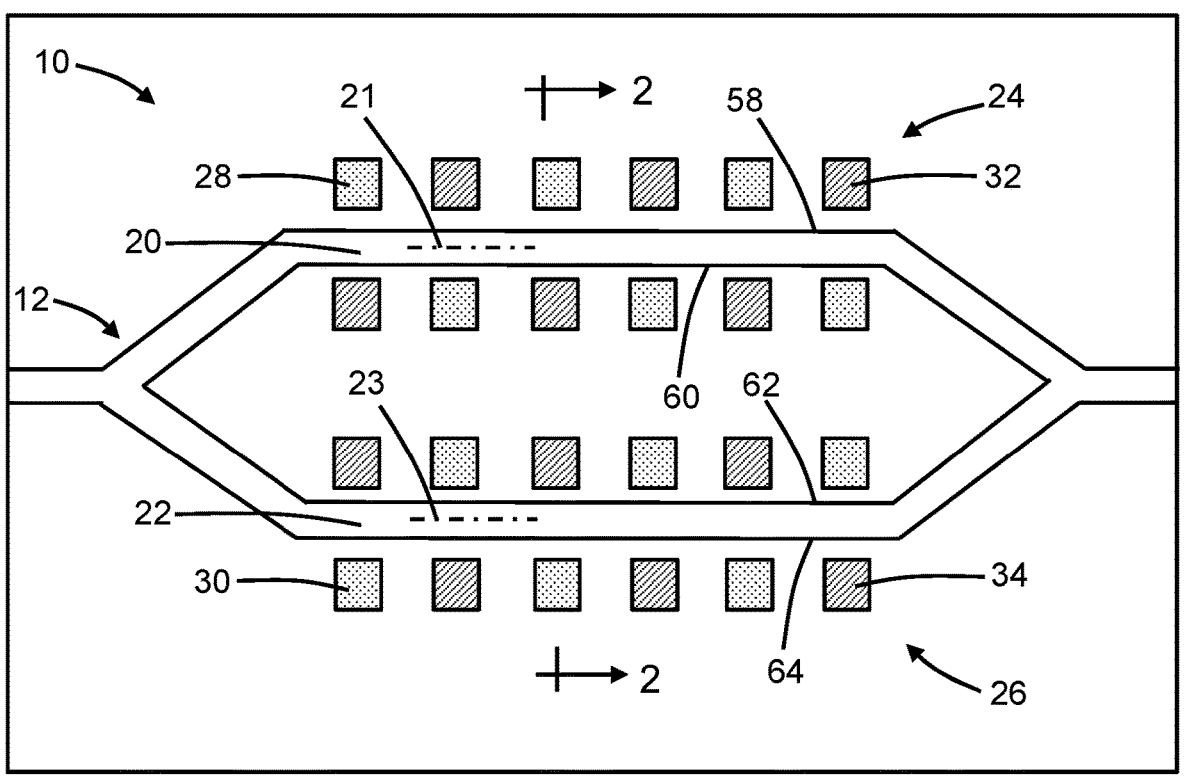
FIG. 1 is a top view of a structure at an initial fabrication stage of a processing method in accordance with embodiments of the invention.
Figure 2:
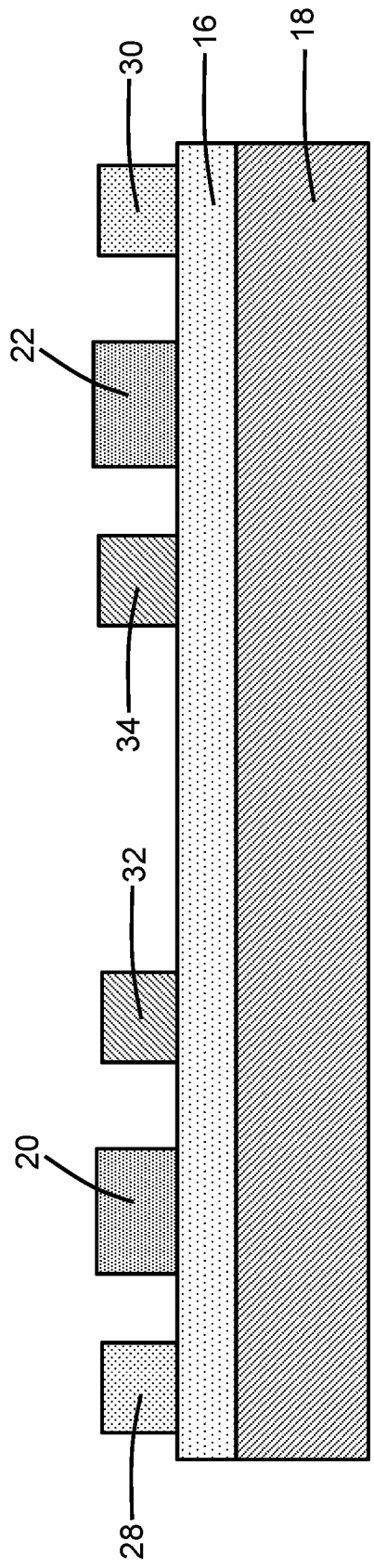
FIG. 2 is a cross-sectional view taken generally along line 2-2 in FIG. 1.

With reference to FIGS. 1, 2 and in accordance with embodiments of the invention, a structure 10 includes a waveguide core 12 that is positioned on, and above, a dielectric layer 16 and a semiconductor substrate 18. In an embodiment, the dielectric layer 16 may be comprised of a dielectric material, such as silicon dioxide, and the semiconductor substrate 18 may be comprised of a semiconductor material, such as single-crystal silicon. In an embodiment, the dielectric layer 16 may be a buried oxide layer of a silicon-on-insulator substrate, and the dielectric layer 16 may separate the waveguide core 12 from the semiconductor substrate 18.

A portion of the waveguide core 12 may configured to function as an optical phase shifter, such as a Mach-Zehnder modulator. In an embodiment, a portion of the waveguide core 12 may be configured as a Mach-Zehnder modulator in which the waveguide core 12 includes an arm or branch 20 and an arm or branch 22 that is positioned adjacent to, and laterally spaced from, the branch 20. The branches 20, 22 of the waveguide core 12 are arranged between an input to the portion of the waveguide core 12 and an output from the portion of the waveguide core 12. The branches 20, 22 of the waveguide core 12 initially diverge away from each other at the input to the optical phase shifter into a divided light path. The branch 20 may include a portion aligned with a longitudinal axis 21, and the branch 22 may include a portion aligned with a longitudinal axis 23. The branches 20, 22 converge back together and merge into a unified light path at the output from the optical phase shifter. The branch 20 of the waveguide core 12 may include opposite sides 58, 60, the branch 22 of the waveguide core 12 may include opposite sides 62, 64, and the side 60 of the branch 20 may be positioned adjacent to the side 62 of the branch 22.

In an embodiment, the waveguide core 12 may be comprised of a material having a refractive index that is greater than the refractive index of silicon dioxide. In an embodiment, the waveguide core 12 may be comprised of a semiconductor material. In an embodiment, the waveguide core 12 may be comprised of single-crystal silicon. The waveguide core 12 may be formed by patterning a layer comprised of its constituent material with lithography and etching processes. In an embodiment, the waveguide core 12 may be formed by patterning the semiconductor material (e.g., single-crystal silicon) of a device layer of a silicon-on-insulator substrate. In an alternative embodiment, the waveguide core 12 may be comprised of a dielectric material, such as silicon nitride, silicon oxynitride, or aluminum nitride.

The structure 10 may include a thermoelectric device 24 that is associated with the branch 20 of the waveguide core 12. The thermoelectric device 24 may include pillars or sections 28 of a thermoelectric material that alternate with pillars or sections 32 of a different thermoelectric material along the length of the branch 20. In an embodiment, the thermoelectric material constituting the sections 28 may be a semiconductor material having an opposite conductivity type from the thermoelectric material constituting the sections 32. The sections 28 and the sections 32 are disposed in a lateral direction transverse to the longitudinal axis 21 on the opposite sides 58, 60 of the branch 20 of the waveguide core 12. Each pair of adjacent sections 28 and 32 defines a couple of the thermoelectric device 24. In an embodiment, the sections 28 and the sections 32 may be positioned directly on the dielectric layer 16.

In an embodiment, the structure 10 may further include a thermoelectric device 26 that is associated with the branch 22 of the waveguide core 12. The thermoelectric device 26 includes pillars or sections 30 of a thermoelectric material and pillars or section 34 of a different thermoelectric material that alternate with the sections 30 along the length of the branch 22. In an embodiment, the thermoelectric material constituting the sections 30 may be a semiconductor material having an opposite conductivity type from the thermoelectric material constituting the sections 34. The sections 30 and the sections 34 are disposed in a lateral direction transverse to the longitudinal axis 23 on the opposite sides 62, 64 of the branch 22 of the waveguide core 12. Each pair of adjacent sections 30 and 34 defines a couple of the thermoelectric device 26. In an embodiment, the sections 30 and the sections 34 may be positioned directly on the dielectric layer 16.

In an embodiment, the sections 28, 30 may be comprised of an n-type semiconductor material. In an embodiment, sections 28, 30 may be comprised n-type polycrystalline silicon. In an embodiment, the sections 28, 30 may be comprised of bismuth telluride. In an embodiment, the sections 28, 30 may be formed by forming a shadow mask and depositing their constituent material by, for example, physical vapor deposition with co-evaporation through the shadow mask. In an alternative embodiment, the sections 28, 30 may be formed by depositing a layer of their constituent material and patterning the deposited layer with lithography and etching processes.

In an embodiment, the sections 32, 34 may be comprised of a p-type semiconductor material. In an embodiment, the sections 32, 34 may be comprised of p-type polycrystalline silicon or p-type polycrystalline silicon-germanium. In an embodiment, the sections 32, 34 may be comprised of antimony telluride. In an embodiment, the sections 32, 34 may be formed by forming a shadow mask and depositing their constituent material by, for example, physical vapor deposition with co-evaporation through the shadow mask. In an alternative embodiment, the sections 32, 34 may be formed by depositing a layer of their constituent material and patterning the deposited layer with lithography and etching processes.

With reference to FIGS. 3, 4, 4A, 4B in which like reference numerals refer to like features in FIGS. 1, 2 and at a subsequent fabrication stage, middle-of-line processing and back-end-of-line processing follow to form an interconnect structure that is coupled to the sections 28, 32 of the thermoelectric device 24 and that is coupled to the sections 30, 34 of the thermoelectric device 26. In particular, a dielectric layer 36 may be formed on the waveguide core 12, the sections 28, 32 of the thermoelectric device 24, and the sections 30, 34 of the thermoelectric device 26. The waveguide core 12, the sections 28, 32 of the thermoelectric device 24, and the sections 30, 34 of the thermoelectric device 26 are embedded in the dielectric material of the dielectric layer 36. Contacts 38 may be formed that extend through the dielectric layer 36 and land on the sections 28, 30 of thermoelectric material, and contacts 39 may be formed that extend through the dielectric layer 36 and land on the sections 32, 34 of thermoelectric material. The dielectric layer 36 may be comprised of a dielectric material, such as silicon dioxide, and the contacts 38, 39 may be comprised of a metal, such as tungsten.

Interconnects 40 and interconnects 42 may be formed as top connectors over the dielectric layer 36 and, along with the contacts 38, 39, may connect the alternating sections 28, 32 of the thermoelectric device 24 in a series circuit. The interconnects 40 connect pairs of adjacent sections 28, 32 that are adjacent to the side 58 or the side 60 (FIG. 1) of the branch 20 of the waveguide core 12 and may be lengthwise aligned parallel to the longitudinal axis 21 (FIG. 1) of the branch 20. The interconnects 42 connect pairs of adjacent sections 28, 32 that are adjacent to the opposite sides 58, 60 of the branch 20 of the waveguide core 12 and may be extend across the branch 20 transverse to the longitudinal axis 21 of the waveguide core 12. The interconnects 42 alternate with the interconnects 40 such that the sections 28 and the sections 32 are connected in the series circuit.

Interconnects 44 and interconnects 46 may be formed as top connectors over the dielectric layer 36 and, along with the contacts 38, 39, may connect the alternating sections 30, 34 of the thermoelectric device 26 in a series circuit. The interconnects 44 connect pairs of adjacent sections 28, 32 that are adjacent to the side 62 or the side 64 (FIG. 1) of the branch 22 of the waveguide core 12 and may be lengthwise aligned parallel to the longitudinal axis 23 (FIG. 1) of the branch 22. The interconnects 46 connect pairs of adjacent sections 28, 32 that are adjacent to the opposite sides 62, 64 of the branch 22 of the waveguide core 12 and may extend across the branch 22 transverse to the longitudinal axis 23 of the waveguide core 12. The interconnects 46 alternate with the interconnects 44 such that the sections 28 and the sections 32 are connected in the series circuit.

The interconnects 40, 42 and the interconnects 44, 46 may be comprised of a low-resistance metal, such as copper. The interconnects 40, 42 provide conductive paths connecting the alternating sections 28, 32 of the thermoelectric device 24 in the associated series circuit. The interconnects 44, 46 provide conductive paths connecting the alternating sections 30, 34 of the thermoelectric device 26 in the associated series circuit.

Figure 3:
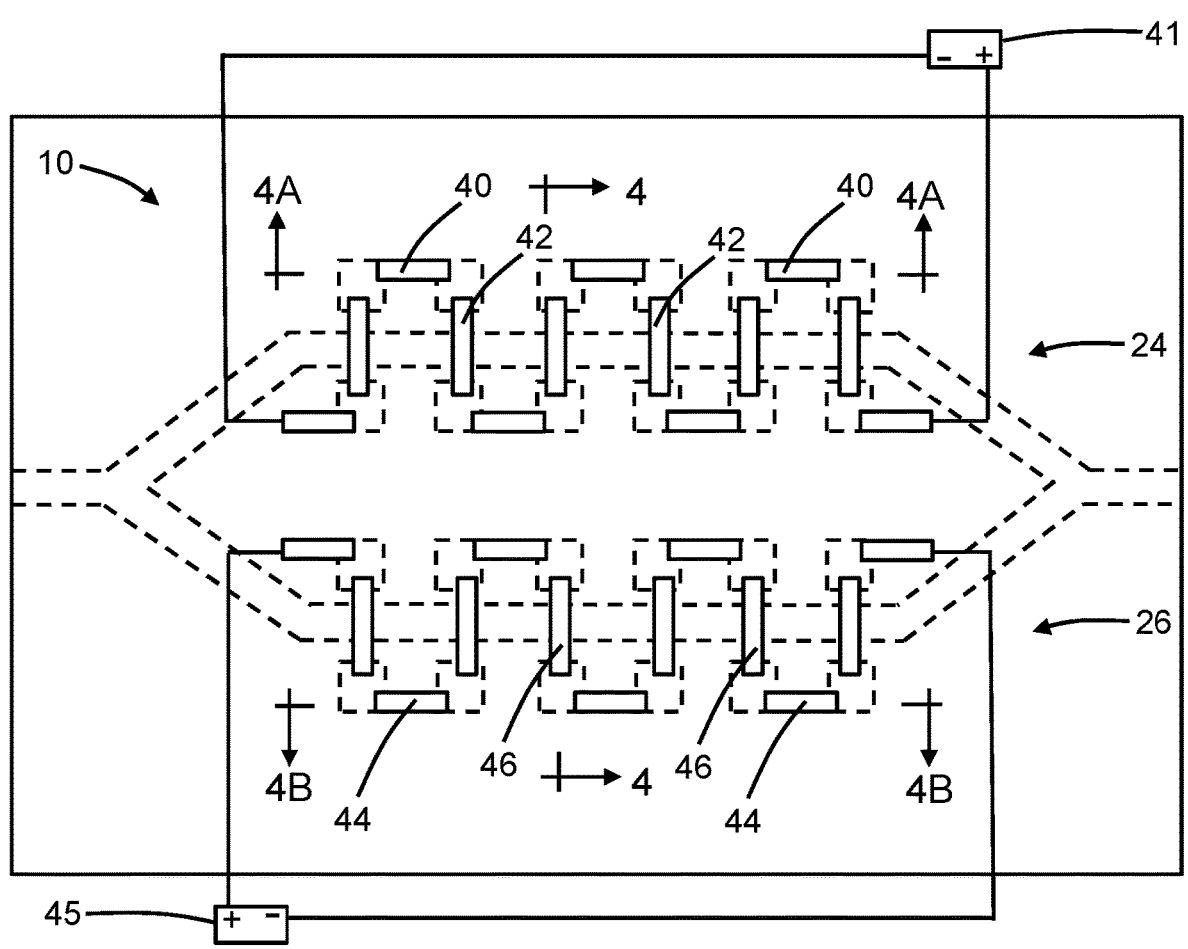
FIG. 3 is a top view of the structure at a fabrication stage subsequent to FIG. 2.
Figure 4:
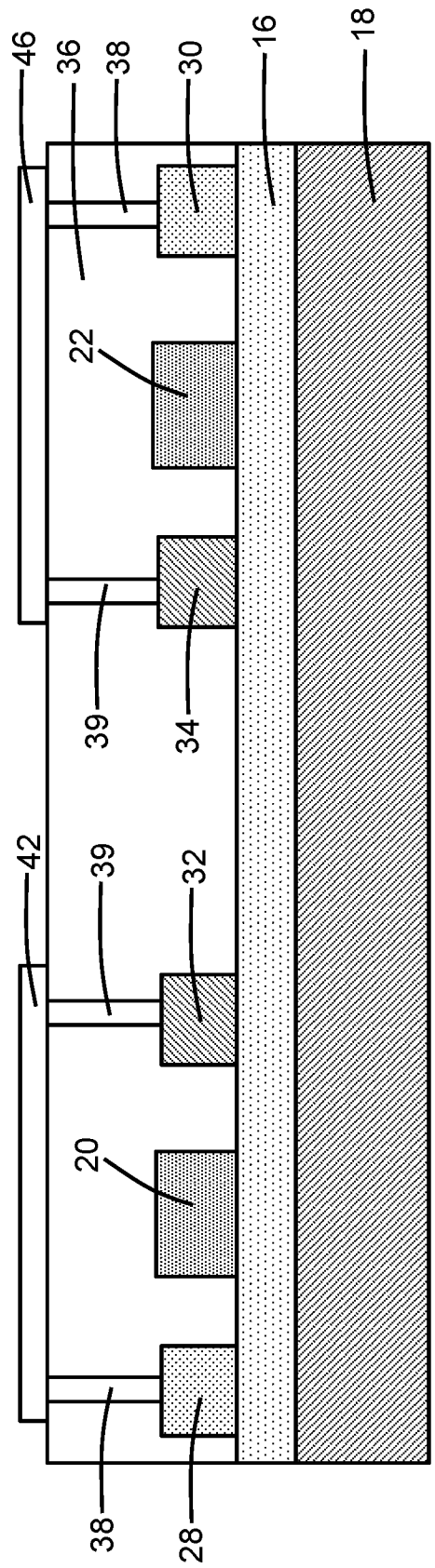
FIG. 4 is a cross-sectional view taken generally along line 4-4 in FIG. 3.
Figure 4A:
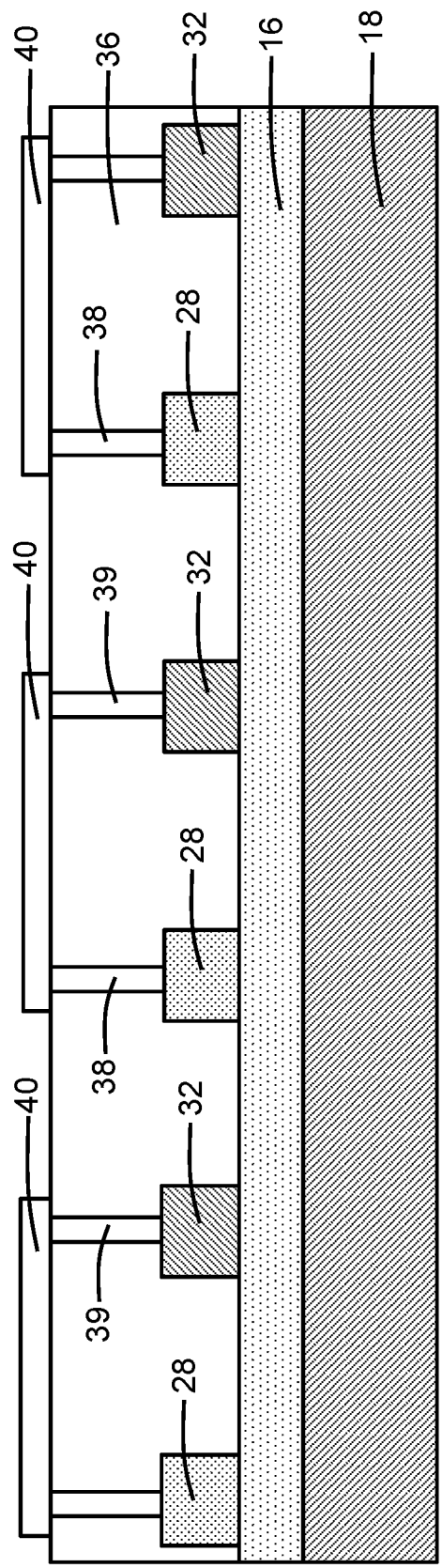
FIG. 4A is a cross-sectional view taken generally along line 4A-4A in FIG. 3.
Figure 4B:
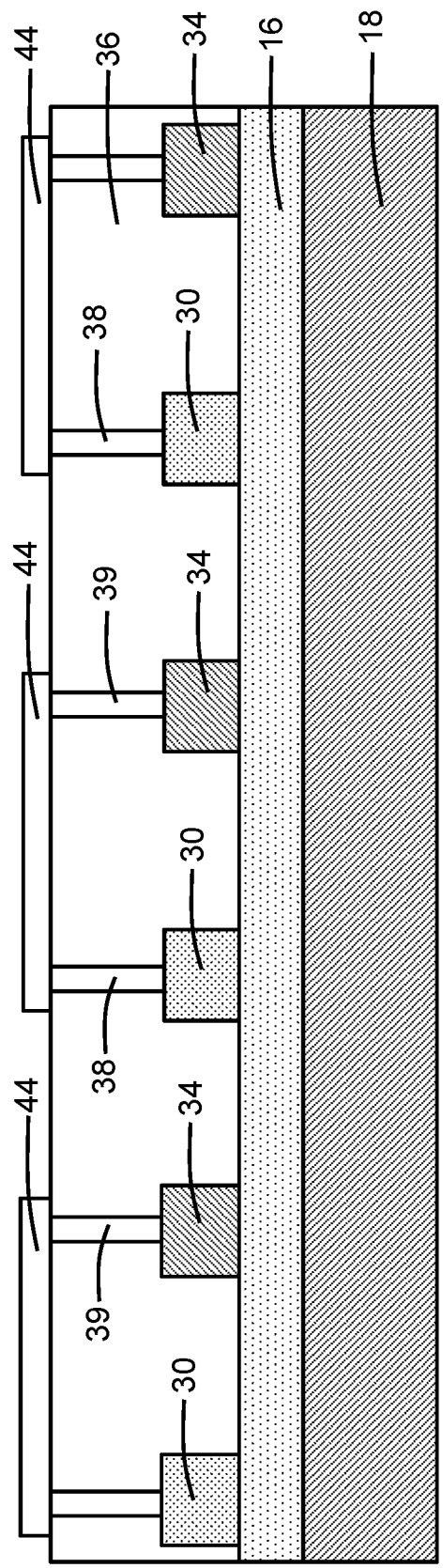
FIG. 4B is a cross-sectional view taken generally along line 4B-4B in FIG. 3.

A power supply 41 may have positive and negative terminals, as diagrammatically indicated in FIG. 3, connected to the series circuit including the interconnects 40, 42 and the sections 28, 32 of the thermoelectric device 24. The power supply 41 may supply a direct current to the thermoelectric device 24 with a current flow direction and a polarity that biases the thermoelectric device 24 to operate by the thermoelectric effect as a Peltier cooler. As a result, the thermoelectric device 24 may be used to extract heat from, and reduce the temperature of, the branch 20 of the waveguide core 12. The temperature reduction experienced by the branch 20 of the waveguide core 12 may result in a blue shift of the wavelength of the light propagating in the branch 20 to a shorter wavelength than input into the optical phase shifter. The blue shift in wavelength increases with increasing power supplied from the power supply 41 to the thermoelectric device 26 and the resulting lower temperature of the sections 28, 32.

A power supply 45 may have positive and negative terminals, as diagrammatically indicated in FIG. 3, connected to the series circuit including the interconnects 44, 46 and the sections 30, 34 of the thermoelectric device 26. The power supply 45 may supply a direct current to the thermoelectric device 26 with a current flow direction and a polarity that biases the thermoelectric device 26 to operate by the thermoelectric effect as a Peltier heater. As a result, the thermoelectric device 26 may be used to supply heat to, and increase the temperature of, the branch 20 of the waveguide core 12. The temperature increase experienced by the branch 22 of the waveguide core 12 may result in a red shift of the wavelength of the light propagating in the branch 22 to a longer wavelength than input into the optical phase shifter. The red shift in wavelength increases with increasing power supplied from the power supply 45 to the thermoelectric device 26 and the resulting higher temperature of the sections 30, 34.

By cooling the branch 20 of the waveguide core 12 to provide a cold junction and heating the branch 22 of the waveguide core 12 to provide a hot junction, the wavelength differential for the phase shift effect of the optical phase shifter may be significantly increased without increasing the power consumption. In addition, the heat extracted by the thermoelectric device 24 to cool the branch 20 may be offset by the heat generated by the thermoelectric device 26 to heat the branch 22 such that thermal equilibrium may be maintained. Thermal stability may be achieved by the concurrent heating and cooling of the different branches 20, 22, and the overall thermal budget on the photonics chip may be reduced. The thermoelectric devices 24, 26 may permit a reduction in the footprint or the length of the optical phase shifter.

In an alternative embodiment, only the thermoelectric device 24 may be included in the structure 10 and powered to either heat or cool the associated branch 20. In an alternative embodiment, only one or the other of the thermoelectric devices 24, 26 may be powered to either heat or cool the associated branch 20. In an alternative embodiment, both of the thermoelectric devices 24, 26 may be used to cool both of the branches 20, 22 of the waveguide core 12 and cause a temperature decrease with associated blue shifting of the wavelength. In an alternative embodiment, both of the thermoelectric devices 24, 26 may be used to heat both of the branches 20, 22 of the waveguide core 12 and cause a temperature increase with associated red shifting of the wavelength.

Figure 5:
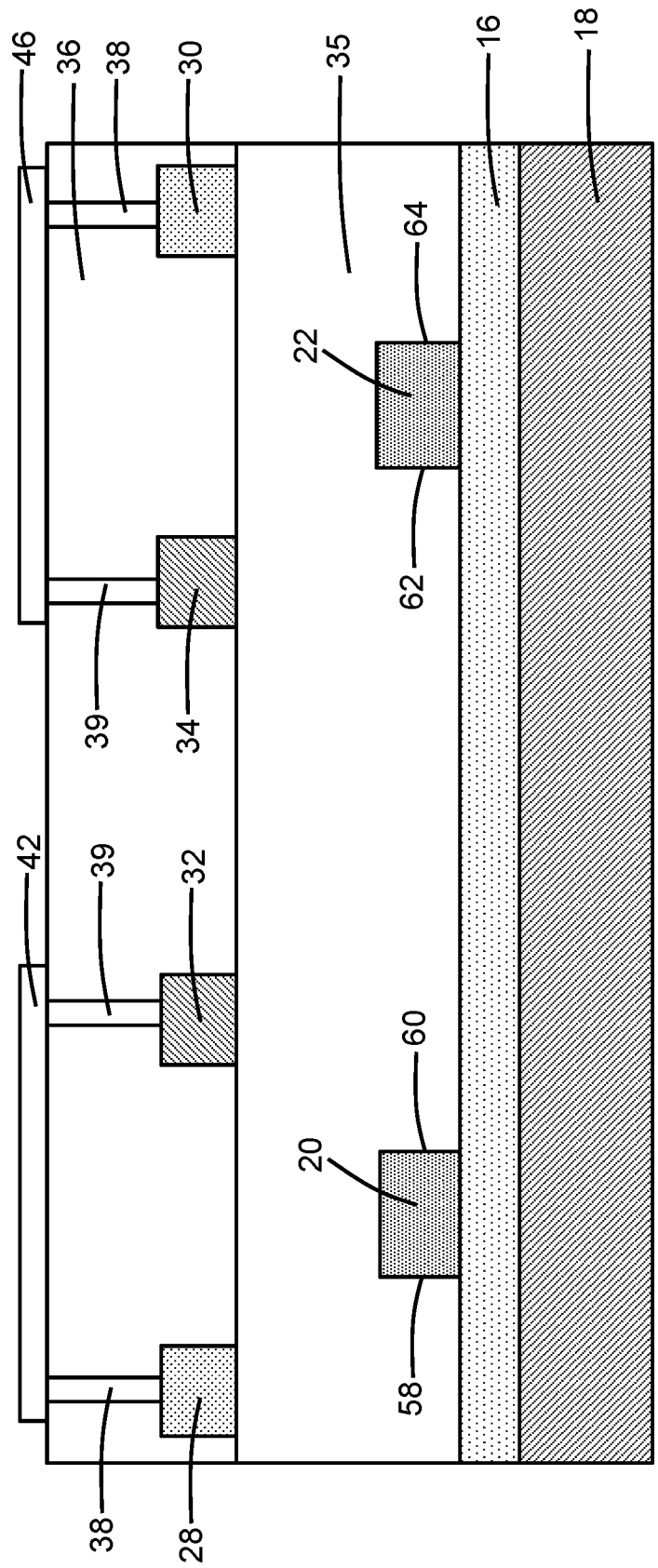
FIG. 5 is a cross-sectional view of a structure in accordance with alternative embodiments of the invention.

With reference to FIG. 5 and in accordance with alternative embodiments, the sections 28, 32 of the thermoelectric device 24 and the sections 30, 34 of the thermoelectric device 26 may be spaced in a vertical direction above the branches 20, 22 of the waveguide core 12 and arranged in a different level of the structure 10 from the branches 20, 22 of the waveguide core 12. A dielectric layer 35 may be formed on the waveguide core 12, and the sections 28, 32 of the thermoelectric device 24 and the sections 30, 34 of the thermoelectric device 26 may be formed on the dielectric layer 35. The waveguide core 12 is embedded in the dielectric material of the dielectric layer 35. The sections 28, 32 of the thermoelectric device 24 may have a non-overlapping relationship with the branch 20 of the waveguide core 12, and the sections 30, 34 of the thermoelectric device 26 may have a non-overlapping relationship with the branch 22 of the waveguide core 12.

Figure 6:
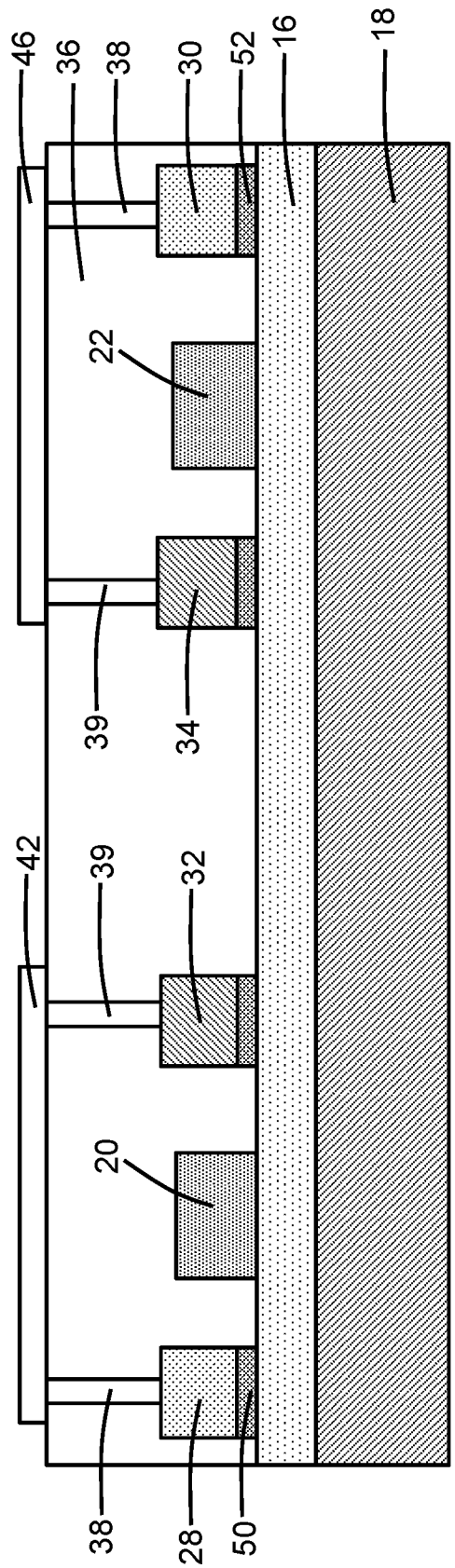
FIGS. 6, 6A, 6B are cross-sectional views of a structure in accordance with alternative embodiments of the invention.
Figure 6A:
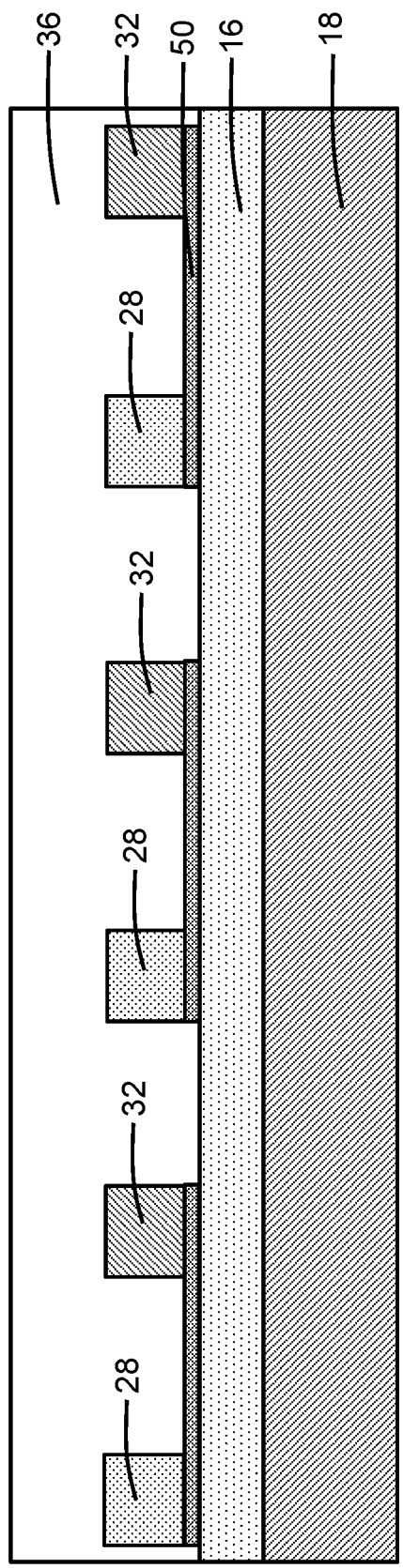
Figure 6B:
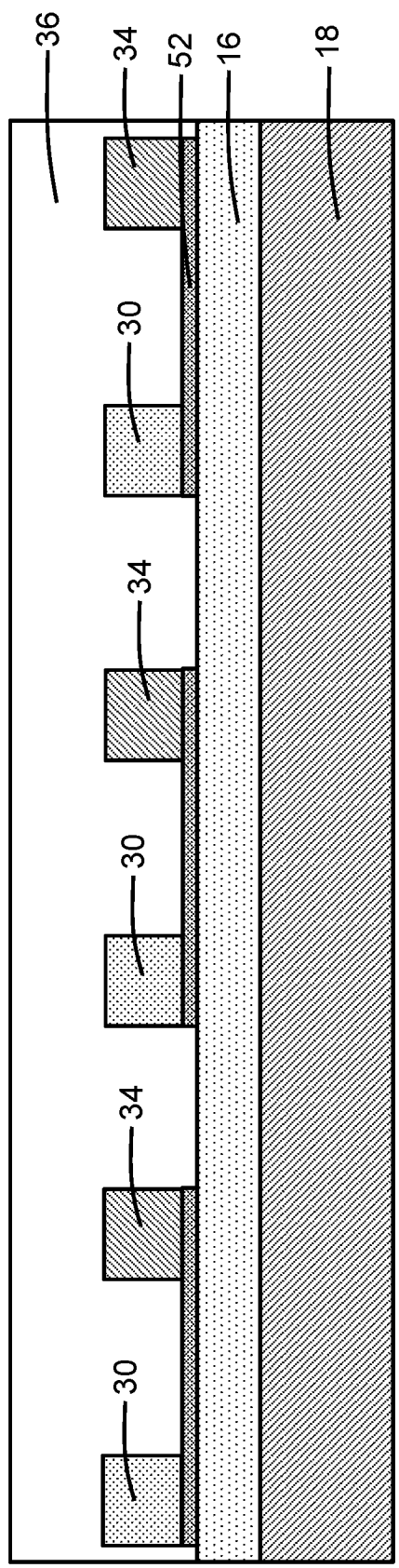

With reference to FIGS. 6, 6A, 6B and in accordance with alternative embodiments, silicide layers 50 may be arranged in a vertical direction between the dielectric layer 16 and the sections 28, 32 of the thermoelectric device 24. Silicide layers 52 may be arranged in a vertical direction between the dielectric layer 16 and the sections 30, 34 of the thermoelectric device 26. The silicide layers 50, 52 may be formed by a silicidation process that involves one or more annealing steps to form a silicide phase by reacting a semiconductor material (e.g., the semiconductor material of the device layer of a silicon-on-insulator substrate) with a deposited layer comprised of a silicide-forming metal, such as nickel. The semiconductor material and/or the layer of silicide-forming metal may be patterned before silicidation to define a layout for the silicide layers 50, 52. An initial annealing step of the silicidation process may consume all or part of the silicide-forming metal to form the silicide layers 50, 52. Following the initial annealing step, any non-reacted silicide-forming metal may be removed by wet chemical etching. The silicide layers 50, 52 may then be subjected to an additional annealing step at a higher temperature to form a lower-resistance silicide phase. In an embodiment, the device layer of a silicon-on-insulator substrate may be fully silicided to form the silicide layers 50, 52. In an alternative embodiment, the device layer of a silicon-on-insulator substrate may be partially silicided to form the silicide layers 50, 52.

The sections 28, 32 of the thermoelectric device 24 may be positioned on the silicide layers 50 such that the silicide layers 50 are disposed in a vertical direction between the dielectric layer 16 and the sections 28, 32. The sections 30, 34 of the thermoelectric device 26 may be positioned on the silicide layers 52 such that the silicide layers 52 are disposed in a vertical direction between the dielectric layer 16 and the sections 30, 34. The silicide layers 50 may replace the interconnects 40 and define bottom connectors between adjacent pairs of the sections 28, 32 in the series circuit of the thermoelectric device 24. The interconnects 42 provide top connectors in the series circuit including the sections 28, 32 of different thermoelectric materials. The silicide layers 52 may replace the interconnects 44 and define bottom connectors between adjacent pairs of the sections 30, 34 in the series circuit of the thermoelectric device 26. The interconnects 46 provide top connectors in the series circuit including the sections 30, 34 of different thermoelectric materials.

Figure 7:
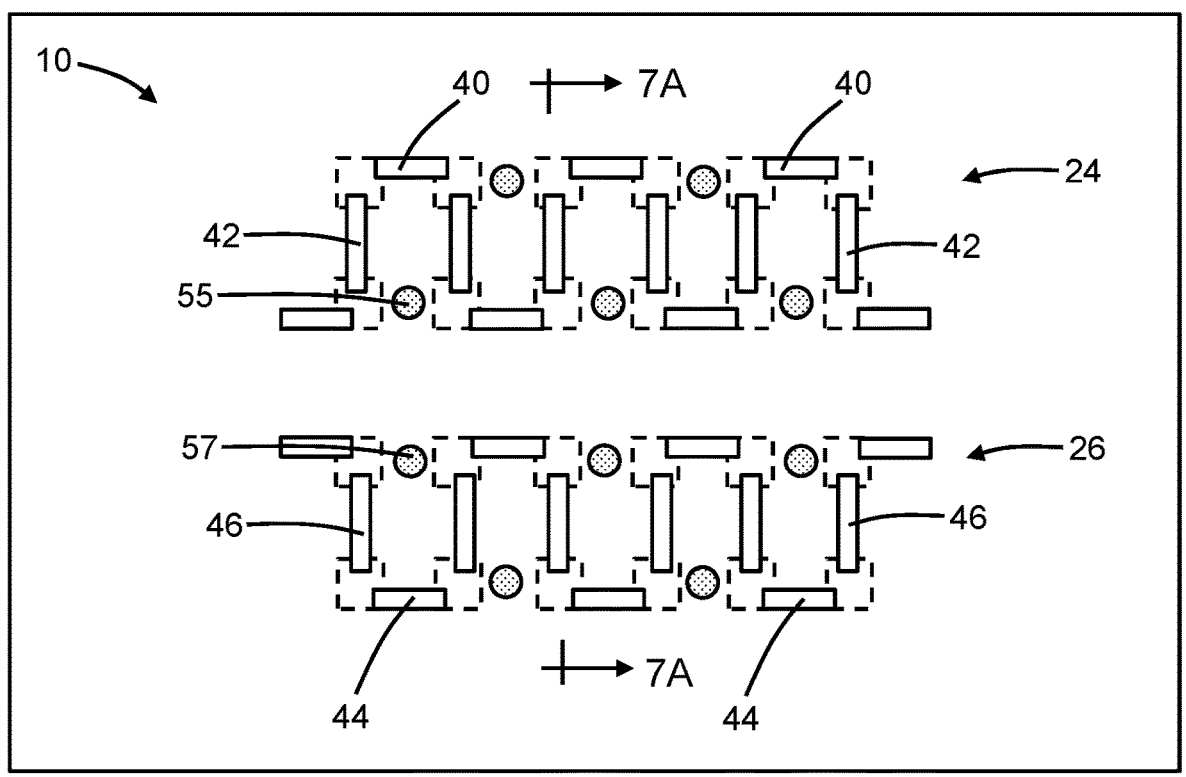
FIG. 7 is a top view of a structure in accordance with alternative embodiments of the invention.
Figure 7A:
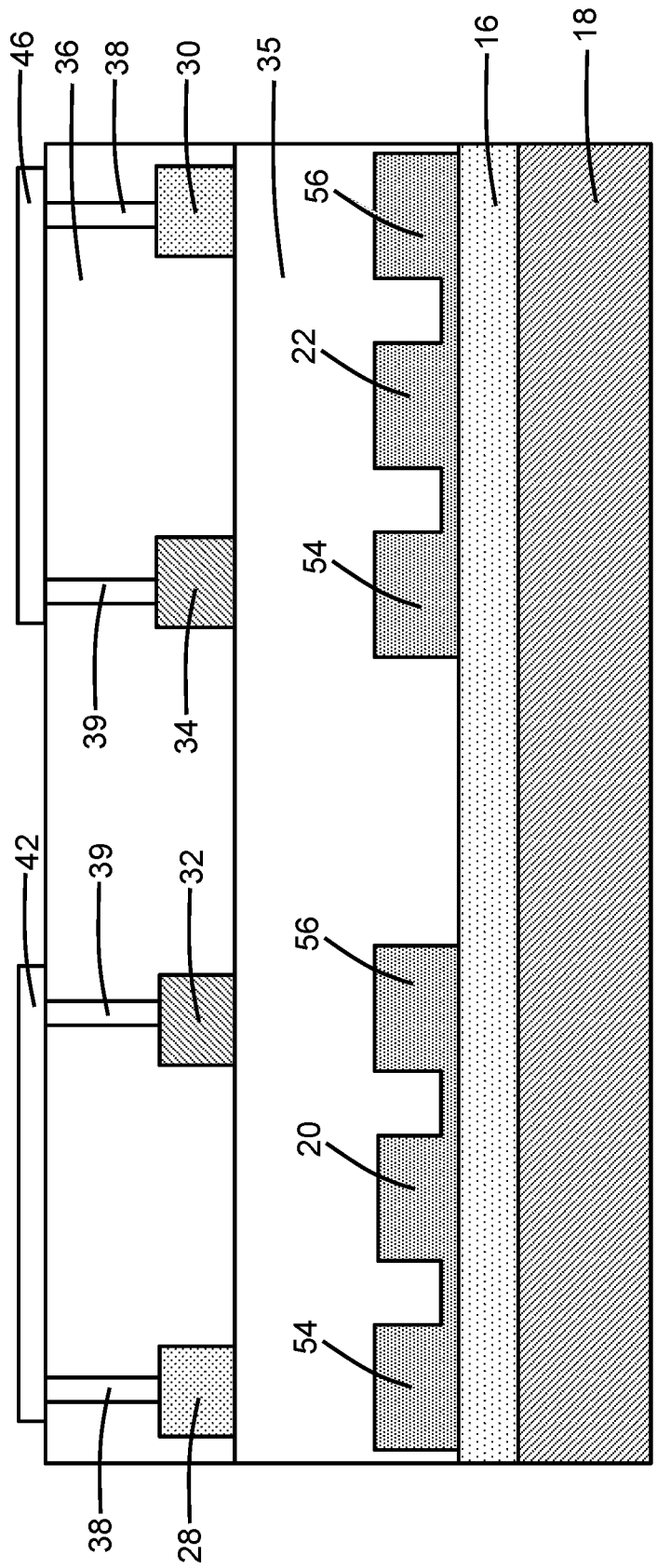
FIG. 7A is a cross-sectional view taken generally along line 7A-7A in FIG. 7.

With reference to FIGS. 7, 7A and in accordance with alternative embodiments, the structure 10 may include a doped region 54 and a doped region 56 associated with each of the branches 20, 22 of the waveguide core 12. The doped regions 54, 56 may have opposite conductivity types and may be separated by an intrinsic region to define a p-i-n junction. In an embodiment, the doped regions 54, 56 may include semiconductor material that is formed when the semiconductor material (e.g., single-crystal silicon) of a device layer of a silicon-on-insulator substrate is patterned to form the waveguide core 12. In an embodiment, the semiconductor material of the doped region 54 may be doped with a p-type dopant (e.g., boron) that provides p-type electrical conductivity, and the semiconductor material of the doped region 56 may be doped with an n-type dopant (e.g., arsenic) that provides n-type electrical conductivity.

The sections 28, 32 of the thermoelectric device 24 and the sections 30, 34 of the thermoelectric device 26, which are spaced in a vertical direction above the branches 20, 22 of the waveguide core 12, may overlap with the doped regions 54, 56. Heavily-doped regions (not shown) of reduced electrical resistance may be formed in a portion of the doped region 54 and in a portion of the doped region 56, and used to establish electrical contacts for biasing the optical phase shifter. In that regard, contacts 55 to the doped region 54 and the doped region 56 of the branch 20 may be formed in the spaces between adjacent pairs of the sections 28, 32 of the thermoelectric device 24 that are not connected by the interconnects 40. Similarly, contacts 57 to the doped region 54 and the doped region 56 of the branch 22 may be formed in the spaces between adjacent pairs of the sections 30, 34 of the thermoelectric device 26 that are not connected by the interconnects 42.

Figure 8:
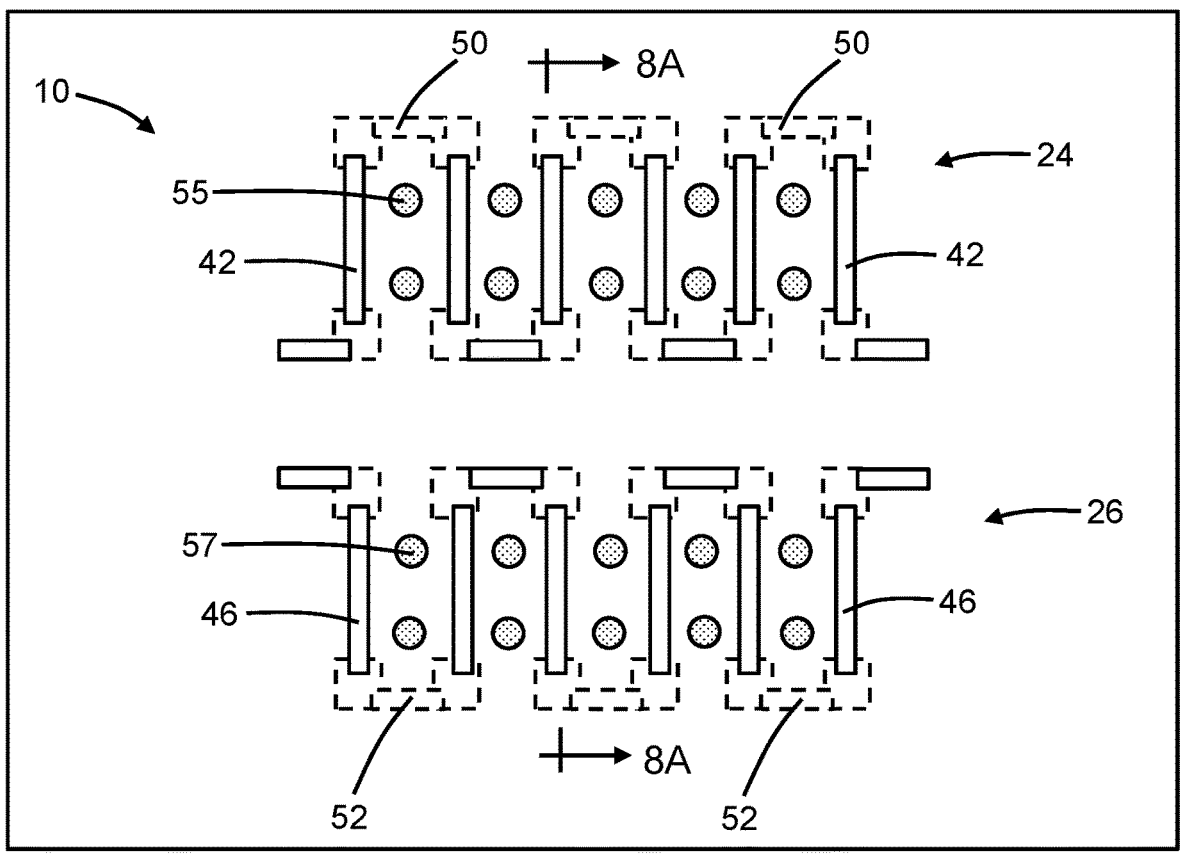
FIG. 8 is a top view of a structure in accordance with alternative embodiments of the invention.
Figure 8A:
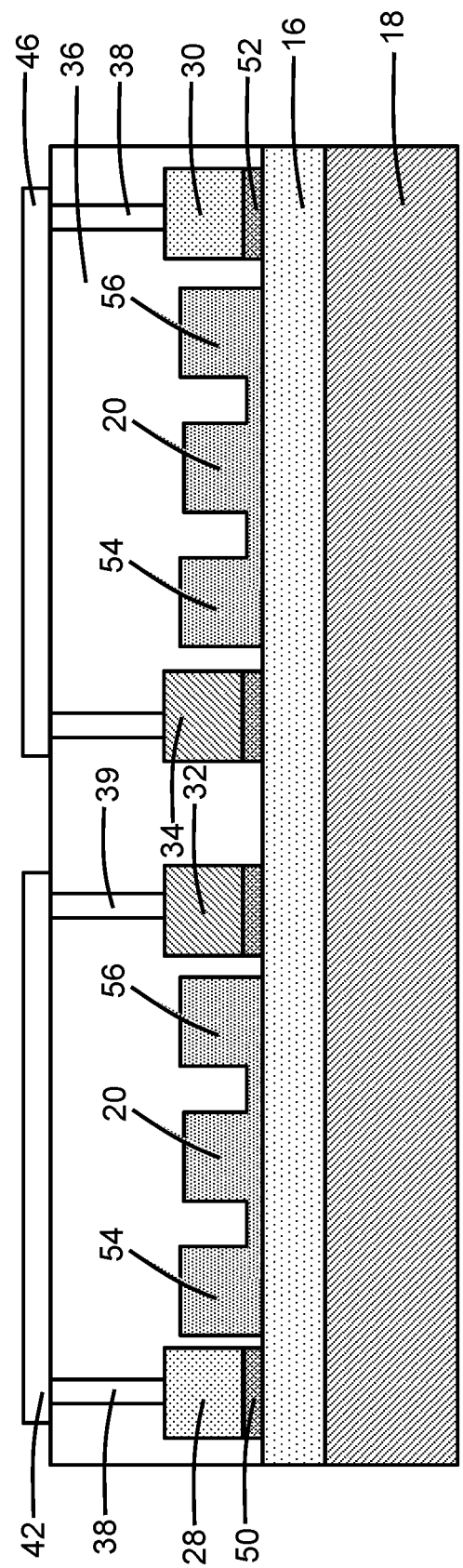
FIG. 8A is a cross-sectional view taken generally along line 8A-8A in FIG. 8.

With reference to FIGS. 8, 8A and in accordance with alternative embodiments, the structure 10 including the doped regions 54, 56 may be used in conjunction with the sections 28, 32 of the thermoelectric device 24 on the silicide layers 50 and the sections 30, 34 of the thermoelectric device 26 on the silicide layers 52. The doped regions 54, 56 associated with the branch 20 may be positioned in the same level as the sections 28, 32 and adjacent to the sections 28, 32 in a lateral direction. The doped regions 54, 56 associated with the branch 22 may be positioned in the same level as the sections 30, 34 and adjacent to the sections 30, 34 in a lateral direction. The contacts 55 to the doped regions 54, 56 associated with branch 20 may be located in spaces between the sections 28, 32 of the thermoelectric device 24 and the branch 20 to avoid the bottom connections provided by the silicide layers 50. The contacts 57 to the doped regions 54, 56 associated with branch 22 may be located in spaces between the sections 30, 34 of the thermoelectric device 26 and the branch 22 to avoid the bottom connections provided by the silicide layers 52.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
an optical phase shifter including a waveguide core having a first arm and a second arm laterally spaced from the first arm, the first arm having a first side and a second side opposite from the first side, and the second arm having a third side adjacent to the first side of the first arm and a fourth side opposite from the third side;
a first thermoelectric device including a first plurality of pillars and a second plurality of pillars that alternate with the first plurality of pillars in a first series circuit, the first plurality of pillars and the second plurality of pillars disposed in the first series circuit on the first side and the second side of the first arm of the waveguide core; and
a second thermoelectric device including a third plurality of pillars and a fourth plurality of pillars that alternate with the third plurality of pillars in a second series circuit, the third plurality of pillars and the fourth plurality of pillars of the second thermoelectric device disposed in the second series circuit on the third side and the fourth side of the second arm of the waveguide core,
wherein the first plurality of pillars and the third plurality of pillars comprise an n-type semiconductor material, and the second plurality of pillars and the fourth plurality of pillars comprising a p-type semiconductor material.

2. The structure of claim 1 further comprising:
a first power supply coupled to the first series circuit, the first power supply configured to supply a current to the first plurality of pillars and the second plurality of pillars of the first thermoelectric device to generate heat for elevating a temperature of the first branch arm of the waveguide core.

3. The structure of claim 2 further comprising:
a second power supply coupled to the second series circuit, the second power supply configured to supply a current to the first plurality of pillars and the second plurality of pillars of the second thermoelectric device to extract heat for cooling the second arm of the waveguide core.

4. The structure of claim 1 wherein the n-type semiconductor material comprises bismuth telluride, and the p-type semiconductor material comprises antimony telluride.

5. The structure of claim 1 wherein the n-type semiconductor material comprises n-type silicon, and the p-type semiconductor material comprises p-type polycrystalline silicon or p-type polycrystalline silicon-germanium.

6. The structure of claim 1 further comprising:
a power supply coupled to the first series circuit, the power supply configured to supply a current to the first plurality of pillars and the second plurality of pillars to generate heat for elevating a temperature of the first arm of the waveguide core.

7. The structure of claim 1 further comprising:
a power supply coupled to the first series circuit, the power supply configured to supply a current to the first plurality of pillars and the second plurality of pillars to extract heat for cooling the first arm of the waveguide core.

8. The structure of claim 1 wherein the first plurality of pillars and the second plurality of pillars are arranged in a plurality of adjacent pairs, and further comprising:
a plurality of silicide layers, each silicide layer connecting one of the plurality of adjacent pairs of the first plurality of pillars and the second plurality of pillars.

9. The structure of claim 8 further comprising:
a semiconductor substrate; and
a dielectric layer on the semiconductor substrate, the dielectric layer positioned between the plurality of silicide layers and the semiconductor substrate.

10. The structure of claim 8 further comprising:
a semiconductor substrate; and
a dielectric layer on the semiconductor substrate,
wherein the plurality of silicide layers are positioned between the dielectric layer and the plurality of adjacent pairs of the first plurality of pillars and the second plurality of pillars.

11. The structure of claim 8 wherein the first arm has a portion that is lengthwise aligned with a longitudinal axis, and each silicide layer is either aligned parallel to the longitudinal axis or extends across the first arm in a direction transverse to the longitudinal axis.

12. The structure of claim 1 further comprising:
a dielectric layer on the waveguide core,
wherein the waveguide core is embedded in the dielectric layer, and the first plurality of pillars and the second plurality of pillars are disposed on the dielectric layer over the first arm of the waveguide core.

13. The structure of claim 12 wherein the optical phase shifter includes a first doped region and a second doped region, the waveguide core is positioned in a lateral direction between the first doped region and the second doped region, each of the first plurality of pillars overlaps with either the first doped region or the second doped region, and each of the second plurality of pillars overlaps with either the first doped region or the second doped region.

14. The structure of claim 1 further comprising:
a dielectric layer on the waveguide core, the first plurality of pillars, and the second plurality of pillars,
wherein the waveguide core, the first plurality of pillars, and the second plurality of pillars are embedded in the dielectric layer.

15. The structure of claim 14 wherein the optical phase shifter includes a first doped region and a second doped region, the first plurality of pillars and the second plurality of pillars are arranged in a plurality of adjacent pairs, and further comprising:
a plurality of silicide layers, each silicide layer connecting one of the plurality of adjacent pairs of the first plurality of pillars and the second plurality of pillars.

16. The structure of claim 15 wherein the first doped region and the second doped region are disposed in a lateral direction between the plurality of silicide layers and the waveguide core.

17. The structure of claim 1 further comprising:
a semiconductor substrate; and
a dielectric layer on the semiconductor substrate,
wherein the dielectric layer is positioned between the first plurality of pillars and the semiconductor substrate, and the dielectric layer is positioned between the second plurality of pillars and the semiconductor substrate.

18. The structure of claim 17 wherein the first plurality of pillars and the second plurality of pillars are disposed directly on the dielectric layer.

19. The structure of claim 1 wherein the first arm diverges from the second arm at an input to the optical phase shifter, and the first arm converges with the second arm at an output from the optical phase shifter.

20. A method comprising:
forming an optical phase shifter including a waveguide core having a first arm and a second arm laterally spaced from the first arm, wherein the first arm has a first side and a second side opposite from the first side, and the second arm has a third side adjacent to the first side of the first arm and a fourth side opposite from the third side;
forming a first thermoelectric device including a first plurality of pillars and a second plurality of pillars that alternate with the first plurality of pillars in a series circuit, wherein the first plurality of pillars and the second plurality of pillars are disposed in the series circuit on the first side and the second side of the first arm of the waveguide core, the first plurality of pillars comprise an n-type semiconductor material, and the second plurality of pillars comprise a p-type semiconductor material; and
forming a second thermoelectric device including a third plurality of pillars and a fourth plurality of pillars that alternate with the third plurality of pillars in a second series circuit, wherein the third plurality of pillars and the fourth plurality of pillars of the second thermoelectric device are disposed in the second series circuit on the third side and the fourth side of the second arm of the waveguide core, the third plurality of pillars comprise the n-type semiconductor material, and the fourth plurality of pillars comprise the p-type semiconductor material.

* * * * *

UNITED STATES PATENT AND TRADEMARK OFFICE
CERTIFICATE OF CORRECTION

| | | |
|---|---|---|
| PATENT NO. | : 12,481,196 B2 | Page 1 of 1 |
| APPLICATION NO. | : 18/094716 | |
| DATED | : November 25, 2025 | |
| INVENTOR(S) | : Vibhor Jain et al. | |

It is certified that error appears in the above-identified patent and that said Letters Patent is hereby corrected as shown below:

In the Claims

Column 8, Claim 2, Lines 66-67 read:
"for elevating a temperature of the first branch arm of the waveguide core."
It should read:
-- for elevating a temperature of the first arm of the waveguide core. --

Signed and Sealed this
Thirtieth Day of December, 2025

John A. Squires
*Director of the United States Patent and Trademark Office*